(12) United States Patent
Miyazaki et al.

(10) Patent No.: US 8,108,906 B2
(45) Date of Patent: Jan. 31, 2012

(54) ELECTRONIC DATA AUTHENTICITY ASSURANCE METHOD AND PROGRAM

(75) Inventors: Kunihiko Miyazaki, Yokohama (JP); Yasuo Hatano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1008 days.

(21) Appl. No.: 12/005,411

(22) Filed: Dec. 27, 2007

(65) Prior Publication Data

US 2008/0216151 A1   Sep. 4, 2008

(30) Foreign Application Priority Data

Dec. 27, 2006   (JP) ................................. 2006-350844

(51) Int. Cl.
*G06F 7/04* (2006.01)
*G06F 17/30* (2006.01)

(52) U.S. Cl. ............... 726/2; 713/176; 380/51; 380/30; 726/26

(58) Field of Classification Search ................. 726/2, 7, 726/26; 713/176; 380/30, 51
See application file for complete search history.

(56) References Cited

U.S. PATENT DOCUMENTS

| | | | | |
|---|---|---|---|---|
| 5,912,974 A * | 6/1999 | Holloway et al. | .............. | 380/51 |
| 6,012,087 A * | 1/2000 | Freivald et al. | .............. | 709/218 |
| 6,021,202 A * | 2/2000 | Anderson et al. | .............. | 705/54 |
| 6,697,997 B1 * | 2/2004 | Fujimura | ..................... | 715/210 |
| 7,174,460 B2 * | 2/2007 | Horita et al. | .............. | 713/176 |
| 7,240,205 B2 * | 7/2007 | Greene et al. | .............. | 713/176 |
| 7,526,645 B2 * | 4/2009 | Miyazaki et al. | .............. | 713/167 |
| 7,814,314 B2 * | 10/2010 | Gentry et al. | .............. | 713/158 |
| 2003/0005305 A1 * | 1/2003 | Brickell | ........................ | 713/177 |
| 2003/0221105 A1 * | 11/2003 | Bajaj | .............................. | 713/176 |
| 2005/0015600 A1 * | 1/2005 | Miyazaki et al. | .............. | 713/176 |
| 2006/0059333 A1 * | 3/2006 | Gentry et al. | ................. | 713/156 |
| 2006/0075245 A1 * | 4/2006 | Meier | ............................... | 713/176 |
| 2006/0117183 A1 | 6/2006 | Hatano et al. | | |
| 2006/0136728 A1 * | 6/2006 | Gentry et al. | ................. | 713/176 |
| 2006/0212707 A1 * | 9/2006 | Cahill et al. | ................... | 713/176 |

(Continued)

FOREIGN PATENT DOCUMENTS

JP   2005-051734   2/2005

(Continued)

OTHER PUBLICATIONS

Bruce Scheiner, "Applied Cryptography, Protocols, Algorithms and Source Code in C", John Wiley & Sons, Inc. Oct. 18, 1995, pp. 483-502.

(Continued)

*Primary Examiner* — David García Cervetti
(74) *Attorney, Agent, or Firm* — McDermott Will & Emery LLP

(57) ABSTRACT

The present invention provides an electronic document authenticity assuring method in which a series of procedures concerning redactable signature are divided into procedures dependent on a document to be signed and procedures dependent on a redactable signature method. Further, the present invention provides program codes that realize the divided procedures and a system comprising apparatuses for implementing those program codes. According to the present invention, even when type of electronic document to be signed is changed or added to, it is sufficient to add a procedure dependent on a document to be signed, without changing procedures dependent on redactable signature methods. Similarly, even when a redactable signature method is to be changed or added, it is sufficient to add a procedure dependent on the redactable signature method without changing procedures dependent on document to be signed.

4 Claims, 7 Drawing Sheets

U.S. PATENT DOCUMENTS

| | | | |
|---|---|---|---|
| 2006/0224895 A1* | 10/2006 | Mayer | 713/176 |
| 2007/0058803 A1* | 3/2007 | Suga | 380/30 |
| 2007/0106908 A1 | 5/2007 | Miyazaki et al. | |
| 2008/0216151 A1* | 9/2008 | Miyazaki et al. | 726/2 |
| 2008/0294903 A1* | 11/2008 | Miyazaki et al. | 713/176 |
| 2009/0265547 A1* | 10/2009 | Gentry et al. | 713/158 |
| 2009/0265548 A1* | 10/2009 | Gentry et al. | 713/163 |
| 2009/0287924 A1* | 11/2009 | Gentry et al. | 713/158 |

FOREIGN PATENT DOCUMENTS

| | | |
|---|---|---|
| JP | 2006-060722 | 3/2006 |
| JP | 2006-180472 | 6/2006 |
| JP | 2007-129507 | 5/2007 |
| JP | 2007-158984 | 6/2007 |
| JP | 2007-188376 | 7/2007 |

OTHER PUBLICATIONS

Steinfeld et al. "Content Extractions Signatures", International Conference on Information Security and Cryptology ICISC 2001, vol. 2288 of LNCS, p. 285-304, XP002385495.

* cited by examiner

ELECTRONIC DATA AUTHENTICITY ASSURANCE METHOD AND PROGRAM

This application claims a priority based on a Japanese patent application, No. 2006-350844 filed on Dec. 27, 2006, the entire content of which is incorporated herein by reference.

BACKGROUND OF THE INVENTION

The present invention relates to a method of assuring authenticity of electronically-generated data.

Conventionally, electronic signature technologies (also referred to as digital signatures) provide methods of assuring authenticity of electronically-generated data (See, for example, Bruce Schneier, Applied Cryptography: Protocols, Algorithms, and Source Code in C, Second Edition, John Wiley & Sons, (Oct. 18, 1995), pp. 483-502 (hereinafter, referred to as Document 1)).

Also, the following techniques are known, i.e., a technique in which a part of a document permitted by a signer can be deleted from a previously-signed document owned by an owner different from the signer, and the validity of the signed document after the deletion can be confirmed (see, for example, Ron Steinfeld, Laurence Bull and Yuliang Zheng, "Content Extryaction Signatures", in International Conference on Information Security and Cryptology ICISC 2001, volume 2288 of LNCS, pp. 285-304, Berlin, 2001, Springer-Verlag (hereinafter, referred to as Document 2)), and an electronic data authenticity assurance technique in which both assurance of authenticity of a disclosed document and deletion of information unsuitable for disclosure are possible (see, for example, US Patent Application Laid-Open No. 2005/0015600 (hereinafter, referred to as Document 3)).

SUMMARY OF THE INVENTION

The digital signature methods (hereinafter, referred to as redactable signature methods) disclosed in Documents 2 and 3 can delete a part of an electronic document while maintaining a signature-verifiable state of the signed document (this operation will be referred to as redaction). According to these methods, when a signature is added to an electronic document, the electronic document is divided into units, each of which can be redacted. Thus, when a redactable signature method is expressed as a program code that operates on a computer or the like, the program code is dependent on type of electronic document to be signed.

On the other hand, plural methods are known as redactable signature methods, for example, a method in which additional redaction is permitted (another entity can additionally redact non-redacted parts of previously-redacted document) and a method in which additional redaction is prevented. In other words, as redactable signature methods, there exist methods having different characteristics. Accordingly, when these methods are expressed as program codes operating on a computer or the like, these program codes are dependent on the respective redactable signature methods.

For example, when a redactable signature method is to be expressed as a program code operating on a computer or the like, it should be described as a different program code for each case where at least either (1) type of electronic document to be signed or (2) a characteristic of the redactable signature method is different.

Thus, development of a new type of electronic document or a new redactable signature method, which is expected in the future, requires development of an overall new corresponding program code. Thus, the number of man-hours in such development is expected to be very large.

The above description applies also to the case of an apparatus that realizes a redactable signature method function by hardware. That is, when an apparatus for realizing a redactable signature method is to be constructed, a different apparatus should be constructed for each case where at least either (a) the type of electronic document to be signed or (2) a characteristic of the redactable signature method is different, and the number of development man-hours becomes very large.

The present invention provides an electronic document authenticity assuring method in which a series of procedures concerning redactable signature are divided into procedures dependent on a document to be signed and procedures dependent on a redactable signature method. Further, the present invention provides program codes that realize the divided procedures and a system comprising apparatuses for implementing those program codes.

According to the present invention, even when type of electronic document to be signed is changed or added to, it is sufficient to add a procedure dependent on a document to be signed, without changing procedures dependent on redactable signature methods. Similarly, even when a redactable signature method is to be changed or added, it is sufficient to add a procedure dependent on the redactable signature method without changing procedures dependent on document to be signed.

In detail, the present invention provides an authenticity assurance system for assuring authenticity of an electronic document, the authenticity assurance system comprising a management apparatus, a redaction-target document structure processing apparatus, a redactable signature method information processing apparatus, a redactable signature processing apparatus and a redaction file output apparatus.

In the authenticity assurance system for assuring authenticity of an electronic document, the management apparatus comprises a unit for inputting data to, and outputting data from the redaction-target document structure processing apparatus, the redactable signature method information processing apparatus, the redactable signature processing apparatus and the signature file output apparatus; the redaction-target document structure processing apparatus comprises: a unit for inputting the electronic document from the management apparatus; a unit for converting the electronic document into a data string of at least one piece of data according to given area partitioning information; a unit for generating an area ID or IDs for identifying respectively the at least one piece of data constituting the data string; and a unit for outputting the converted data string and the generated area ID or IDs to the management apparatus; the redactable signature method information processing apparatus comprises: a unit for inputting the converted data string and the generated area ID or IDs from the management apparatus; a unit for generating a random number for each piece of data of the converted data string; a unit for calculating a hash value for data that are obtained by combining the converted data string and the generated random numbers; a unit for outputting the hash values; a unit for generating redactable signature method information that includes the area ID or IDs and the random numbers or data capable of calculating the random numbers; and a unit for outputting the redactable signature method information to the management apparatus; the redactable signature processing apparatus comprises: a private key; a unit for inputting the hash value from the management apparatus; a unit for calculating a signature value from the hash value and the private key; and a unit for outputting the signature value to the management apparatus; and the signature file output apparatus comprises: a unit for inputting the area partitioning information, the redactable signature method information and the signature value from the management apparatus; a unit for converting the area partitioning information, the redactable signature method information and the signature value into a signature file conforming to a given signature output format; and a unit for outputting the signature file to the management apparatus.

Further, the present invention provides an electronic document redaction system that deletes secret information included in a signed electronic document, the electronic document redaction system comprising a management apparatus, a redaction-target document structure processing apparatus, a redactable signature method information processing apparatus, and a signature file output apparatus;

In this electronic document redaction system, the management apparatus comprises a unit for inputting and outputting data from and to the redaction-target document structure processing apparatus, the redactable signature method information processing apparatus and the signature file output apparatus; the redaction-target document structure processing apparatus comprises: a unit for inputting the electronic document and a signature file for the electronic document from the management apparatus; a unit for converting the electronic document into a data string of at least one piece of data according to area partitioning information included in the signature file; a unit for deleting or replacing a part of the electronic document by other data according to given redaction area designation information; and a unit for outputting the converted data string and the electronic document, the part of which has been deleted or replaced to the management apparatus; the redactable signature method information processing apparatus comprises: a unit for inputting the converted data string and redactable signature method information included in the signature file from the management apparatus; a unit for converting the inputted redactable signature method information according to the redaction area designation information; and a unit for outputting the converted redactable signature method information to the management apparatus; and the signature file output apparatus comprises: a unit for inputting the area partitioning information and a signature value included in the signature file and the converted redactable signature method information from the management apparatus; a unit for converting the area partitioning information, the converted redactable signature method information and the signature value into a signature file conforming to a given signature output format; and a unit for outputting the converted signature file to the management apparatus.

Further, the present invention provides an authenticity verification system that verifies authenticity of an electronic document, the authenticity verification system comprising a management apparatus, a redaction-target document structure processing apparatus, a redactable signature method information processing apparatus; and a redactable signature verification apparatus.

In this authenticity verification system, the management apparatus comprises a unit for inputting and outputting data from and to the redaction-target document structure processing apparatus, the redactable signature method information processing apparatus and the redactable signature processing apparatus; the redaction-target document structure processing apparatus comprises: a unit for inputting the electronic document and a signature file for the electronic document from the management apparatus; a unit for converting the electronic document into a data string of at least one piece of data according to area partitioning information included in the signature file; and a unit for outputting the converted data string to the management apparatus; the redactable signature method information processing apparatus comprises: a unit for inputting the converted data string and redactable signature method information included in the signature file from the management apparatus; a unit for calculating a hash value from the inputted redactable signature method information and the converted data string; and a unit for outputting the calculated hash value to the management apparatus; and the redactable signature verification apparatus comprises: a unit for inputting the hash value and a signature value included in the signature file from the management apparatus; a unit for verifying consistency between the hash value and the signature value; and a unit for outputting a result of the verification to the management apparatus.

According to the above-described modes of the present invention, even when the type of electronic document to be signed is changed or added to, it is sufficient to add a procedure dependent on the document to be signed, without changing procedures dependent on redactable signature methods. Similarly, even when a redactable signature method is changed or added to, it is sufficient to add a procedure dependent on the redactable signature method without changing procedures dependent on the document to be signed.

Further, according to the above-described modes of the present invention, processing steps can be realized respectively on different apparatuses. Thus, by sharing processing, it is possible to adapt a small number of apparatuses for many types of electronic documents and many redactable signature methods.

According to the present invention, even when an electronic document to be signed or a redactable signature method is changed or added to, it is possible to cope with such a situation with a small number of man-hours.

These and other benefits are described throughout the present specification. A further understanding of the nature and advantages of the invention may be realized by reference to the remaining portions of the specification and the attached drawings.

DETAILED DESCRIPTION OF THE PREFERRED EMBODIMENTS

Figure 1:
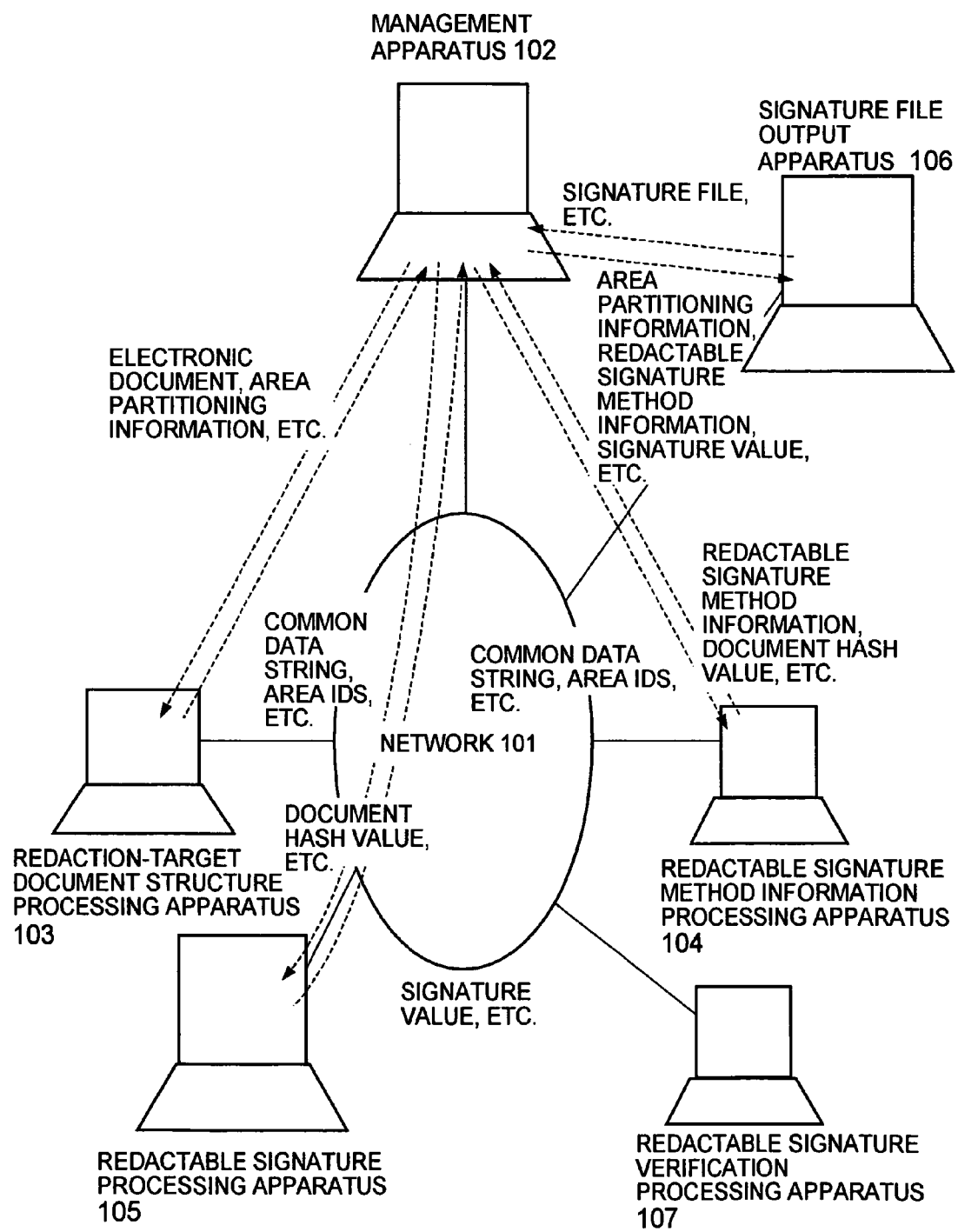
FIG. 1 is a schematic diagram showing a configuration of a network system for realizing an embodiment of the present invention.

The present invention will be described referring to an embodiment in which the present invention is applied to a system that adds a signature to an electronic document according to a redactable signature method. In the present embodiment, an electronic document includes: electronically-described text, numeric values, figures, speech, images (still image, moving image or the like), design drawings, maps, forms, statistics, bio-information, chemical formulas (composition formulas, structural formulas or the like), tables, calculation formulas, computer program codes, or log data, and data that electronically describes operations, conditions, relations, created date, person who created data, person who amended data, persons who view the data, persons allowed to view the data, creation devices, amending devices, viewing devices, storage devices, and the like, associated with the data; or data constructed by combining such data.

An outline of a redactable signature method (hereinafter, referred to as SUMI-4) used in the present embodiment is described in the following. The present invention, however, is not limited to this redactable signature method. For example, the present invention can be applied similarly to the method (hereinafter, referred to as SUMI-5) described in Document 3, according to which disclosure conditions can be set. As described below, even when a plurality of redactable signature methods are used, the present invention is advantageous in that apparatuses and program codes can be developed spending less time and effort, in comparison with cases where apparatuses and program codes are developed separately for each method.

Outline of Redactable Signature Method: Signature Generation Processing
1. An electronic document to be signed is divided into units, each of which is redactable (i.e. can be redacted). In the following, the divided electronic document is considered as a set of plural redactable blocks.
2. A random number is generated for each redactable block.
3. For each redactable block, data of the block are combined with the random number generated in step 2, to calculate a hash value of the combined data.
4. The hash values calculated in step 3, the number of which is the same as the number of the redactable blocks, are combined, to calculate a hash value of the combined data.
5. An electronic signature is generated with respect to the hash value calculated in step 4.
6. Data consisting of the random number generated in step 2, the electronic signature generated in step 5 and the electronic document as the object of signatures are referred to as a redactable-signature-added electronic document.

Outline of Redactable Signature Method: Redaction Processing
1. Out of the redactable blocks included in the redactable-signature-added electronic document, blocks to be actually redacted are selected.
2. For each of the blocks selected in step 1, the data of the redactable block in question and the random number corresponding to that block are combined, to calculate a hash value of the combined data.
3. All the redactable blocks and their random numbers corresponding to the blocks selected in step 1 are deleted from the redactable-signature-added electronic document, while the hash values calculated in step 2 are added to the resultant data. The obtained data is referred to as a redacted redactable-signature-added electronic document.

Outline of Redactable Signature Method: Signature Verification Processing
1. For each non-redacted block of the redacted redactable-signature-added electronic document, the data of the redactable block in question and the corresponding random number are combined, to calculate a hash value of the combined data.
2. The hash values calculated in step 1 and the hash values of the redacted blocks of the redacted redactable-signature-added electronic document are combined.
3. The electronic signature included in the redacted redactable-signature-added electronic document is verified with respect to the data obtained in step 2.

Here, the hash values in the outline of the redactable signature method are output values of a function that is called a hash function. The hash function in the present embodiment is a function that receives input of data of any length and outputs data of fixed length, and is distinguished in that estimation of the original input data from an output value (a hash value) is very difficult, and search of two different pieces of input data giving the same output value (hash value) is very difficult. As well-known examples of a hash function, SHA-1, SHA-224, SHA-256, SHA-384 and SHA-512 may be cited. Hash functions that can be used in the present invention are not limited to these hash functions.

Further, the electronic signature in the outline of the redactable signature method is data used for assuring that electronic data are generated or confirmed by a signer and have not been changed since that time. Generally, data of any length is inputted to calculate a hash value. The obtained hash value is subjected to a padding process to obtain data of predetermined length. The resultant data is subject to calculation using a private key owned secretly by a signer only, and the resultant output value is called an electronic signature. By using data called a public key corresponding to the private key, it is possible to confirm whether this output value is consistent with the input data. This confirmation processing is generally called signature verification processing. In the case where input data length is known to be short, the processing of calculating the hash value may be omitted. As well-known examples of an electronic signature method, RSA signature, DSA signature and ECDSA signature may be cited. Electronic signature methods usable in the present invention are not limited to these electronic signature methods. Unless otherwise stated, cases where an RSA signature is used will be described in the following. The generation of an electronic signature in step 5 of Signature Generation Processing of the Outline of Redactable Signature Method can be performed according to a publicly-known electronic signature method. Similarly, the verification of an electronic signature in step 3 of Signature Verification Processing can be performed according to a publicly-known electronic signature verification method.

FIG. 1 is a schematic configuration of a system in the present embodiment.

As shown in the figure, the present system comprises: a management apparatus 102, which receives an electronic document and various kinds of instructions (such as information specifying redactable parts) required for adding a redactable signature to the electronic document, and outputs a signature file through a network 101; a redaction-target document structure processing apparatus 103, which receives information including the electronic document and area partitioning information from the management apparatus 102, and returns an area ID and a common data string; a redactable signature method information processing apparatus 104, which receives information including the area ID and the common data string from the management apparatus 102, and returns information including redactable signature method information and a hash value; a redactable signature processing apparatus 105, which receives information including the hash value from the management apparatus 102, and returns information including a signature value; and a signature file output apparatus 106, which receives information including the signature value, the area partitioning information and redactable signature method information from the management apparatus 102, and returns information including the signature file. Further, the present system is coupled with a redactable signature verification processing apparatus 107, which receives information including the hash value and the signature value from the management apparatus 102, and returns a verification result, at the time of signature verification In the present embodiment, a description will be given taking an example in which there is one of each type of apparatus. However, there is no restriction thereto, and a plurality of each of the apparatuses is possible.

In the present embodiment, a protocol for sending and receiving data between apparatuses can be designed suitably, depending on the environment of the network, required performance, required security level, or the like. For example, in cases where the function of each apparatus in the present embodiment is provided as a Web service, a protocol using XML, such as Simple Object Access Protocol (SOAP), may be used. Further, it is more favorable from the viewpoint of security to ensure the security of communication channels by employing a security protection function defined in a specification referred to as WS-Security. Further, in the case where each apparatus is coupled through a cable such as a serial cable, a USB cable, or the like, data can be sent and received by employing a suitable method supported by the standard concerned.

In the present embodiment, a description is given taking an example where all the apparatuses are physically separate apparatuses. The present invention, however, can be applied to embodiments different from this. For example, functions of two or more apparatuses among these apparatuses may operate on the same apparatus. Sending and receiving of data between a plurality of apparatuses (functions) operating on one physical apparatus may be performed by a method using a memory, such as pass-by-value, pass-by-reference, or the like.

Figure 2:
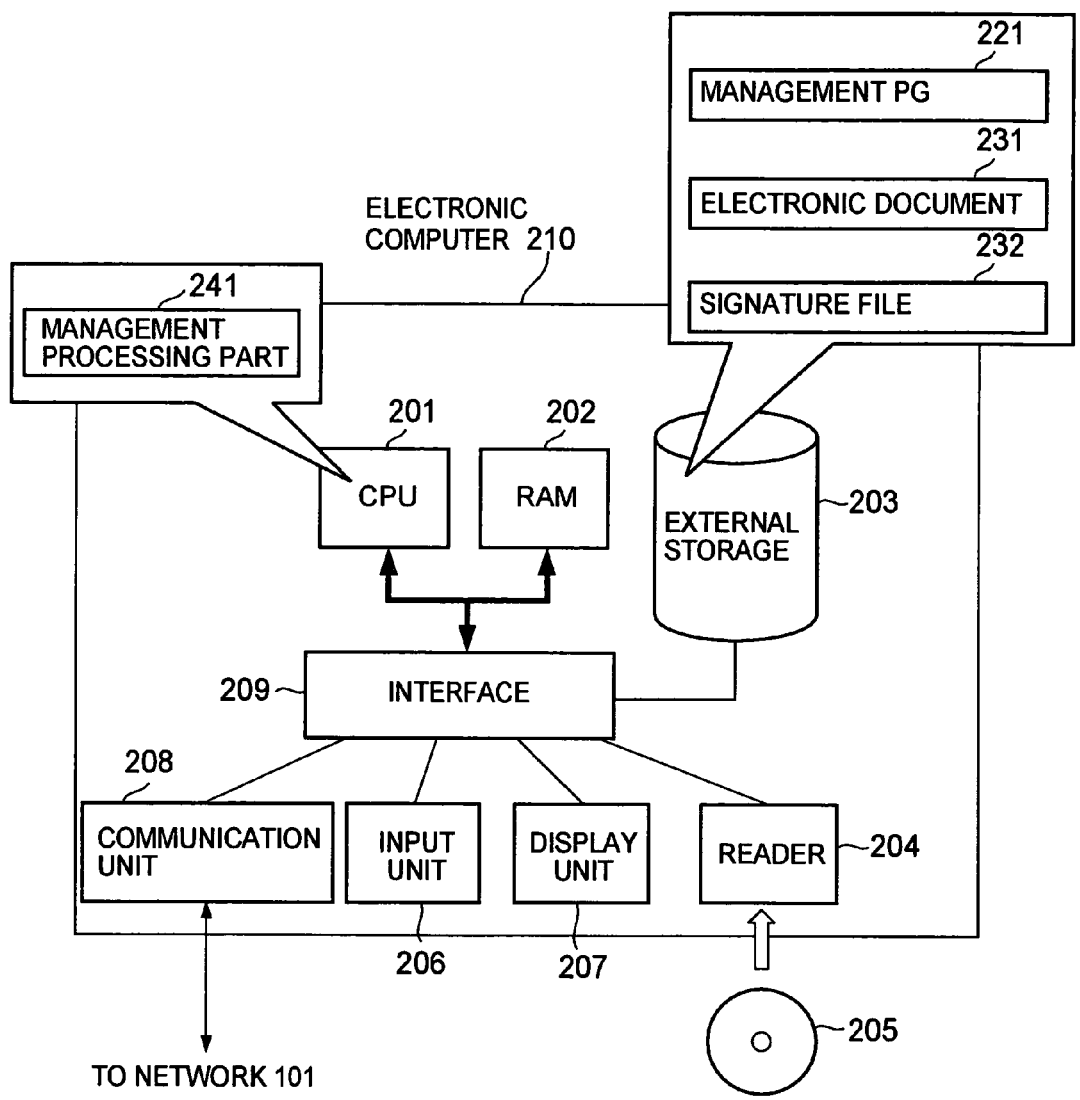
FIG. 2 is a schematic diagram showing a configuration of a management apparatus 102 in the embodiment.

FIG. 2 is a schematic diagram showing a configuration of the management apparatus 102 in the present embodiment.

The management apparatus 102 can be implemented by an electronic computer 210 having an ordinary configuration comprising a CPU 201, a RAM 202 functioning as a work area of the CPU 201, an external storage 203 such as a hard disk unit, a reader 204 for reading data from a storage medium 205 such as a CD-ROM, an FD or the like, an input unit 206 such as a keyboard or a mouse, a display unit 207 such as a liquid crystal display, a communication unit 208 for communicating with another apparatus through a network, and an interface 209 for sending and receiving data between the above-mentioned components.

The external storage 203 of the management apparatus 102 stores a management program (management PG) 221. This program is loaded onto the RAM 202, and executed by the CPU 201 to implement a process which is called a management processing part 241. Further, the external storage 203 stores data (such as electronic document 231 and a signature file 232) that become input or output of each processing part.

Also, the redaction-target document structure processing apparatus 103, the redactable signature method information processing apparatus 104, the redactable signature processing apparatus 105, the signature file output apparatus 106 and the redactable signature verification processing apparatus 107 each have a configuration similar to the management apparatus 102. An external storage of the redaction-target document structure processing apparatus 103 stores a redaction-target document structure processing PG 222. An external storage of the redactable signature method information processing apparatus 104 stores a redactable signature method information processing PG 223. An external storage of the redactable signature processing apparatus 105 stores a redactable signature processing PG 224 and a signature private key 225. It is desired from the viewpoint of security that the signature private key 225 be managed especially strictly. Thus, the signature private key 225 may be stored in an apparatus that is tamper resistant and separate from other external storages storing the other data. An external storage of the signature file output apparatus 106 stores a signature file output PG 226. An external storage of the redactable signature verification processing apparatus 107 stores a redactable signature verification processing PG 227. For each apparatus, a processing part having the same name as that apparatus is realized on that apparatus when the CPU 201 executes the program concerned among the above-mentioned stored programs, and performs processing described in the following.

The following description assumes that each program is previously stored in the external storage 203. However, each program may be introduced into the external storage 203 or the RAM 202 through the external interface mentioned above, using another storage medium such as an FD or a CD-ROM, or a network, such as the Internet, as a communication medium, or by a carrier wave or a digital signal that propagates through a network.

In the present embodiment, a description is given taking an example where the function of each apparatus is realized by a software program on a computer of an ordinary configuration, as shown in FIG. 2. The present invention, however, can be applied to embodiments different from this. For example, a function or functions of one or more apparatuses may be realized by a hardware device or devices. For example, in one of such embodiments, the redactable signature processing apparatus 105 may be a Hardware Security Module (HSM). Since, as described below, the redactable signature processing apparatus 105 holds secret information called a signature private key 225, such an arrangement is favorable from the viewpoint of security.

Further, the redactable signature processing apparatus 105 of the present embodiment may be an apparatus of a Time-Stamping Authority (TSA) that generates a digital time stamp. In this case, the TSA apparatus adds time information managed by the TSA to input data, before adding a signature to the input data. Thus, there is also an advantage in that the time for which an electronic document exists can be assured also. In this case, in order that a user or an apparatus that has received a signed electronic document can know the time for which the electronic document exists, it is sufficient that the TSA apparatus returns, as well as the signature value, the time information added by itself to the management apparatus 102, so that the signature file outputted finally from the management apparatus 102 includes the time information.

Figure 3:
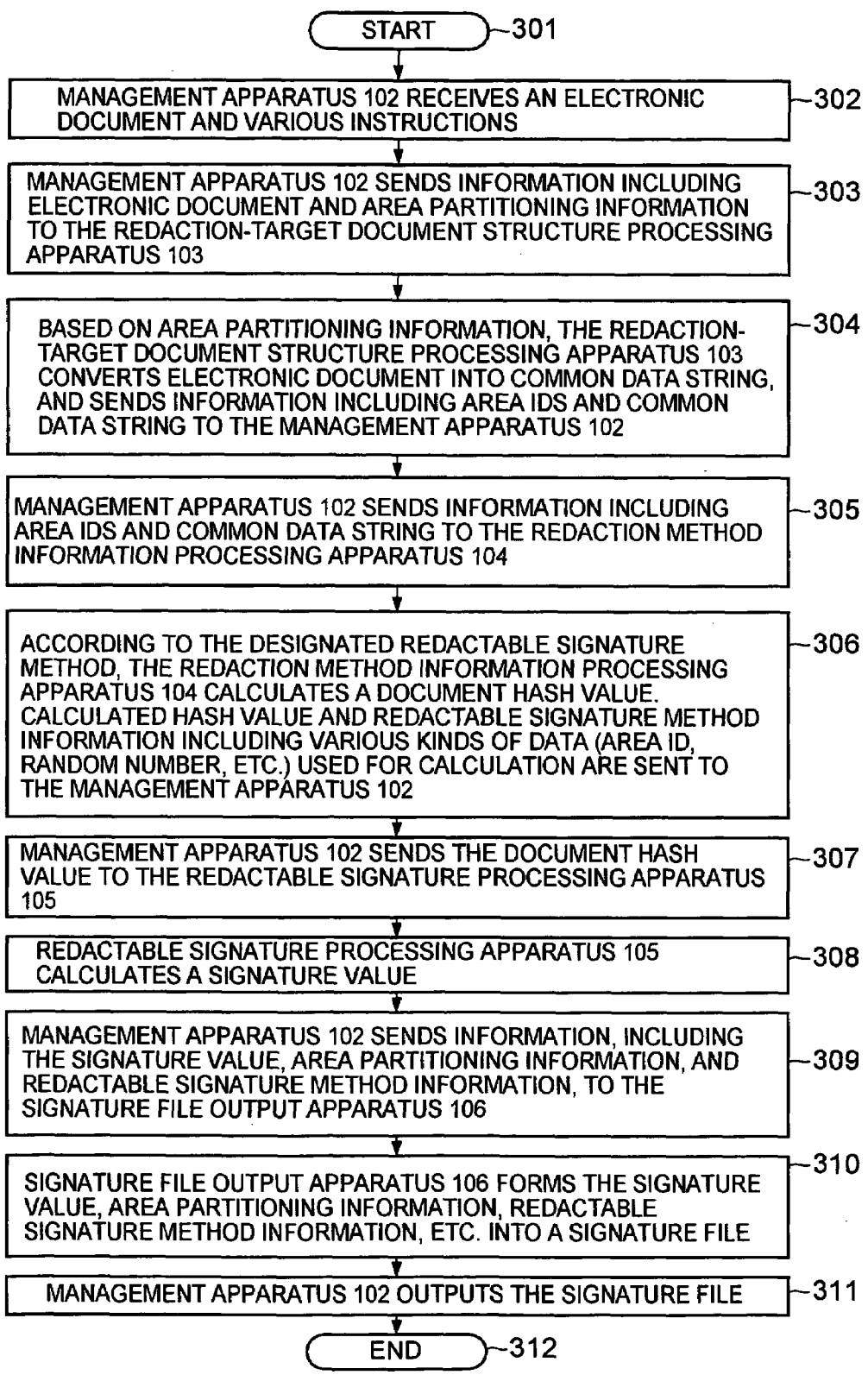
FIG. 3 is a flowchart showing an outline of processing of adding a redactable signature to an electronic document in the embodiment.

FIG. 3 is a flowchart showing an outline of flow of signature generation processing in the present embodiment.

301: Start

302: The management apparatus 102 receives an electronic document and various instructions. The various instructions are arranged to include a file path and file type of the electronic document, a signature method, area partitioning information and an output signature file type (It is assumed in the following that the file type specified is the XML format, the signature method is a combination of SUMI-4 and RSA signature, and the output signature file type is the XML signature format).

303: According to the file type specified in the instructions, the management apparatus 102 selects a suitable redaction-target document structure processing apparatus 103 that can process the file type in question, and sends information including the electronic document and the area partitioning information to the selected redaction-target document structure processing apparatus 103.

304: The redaction-target document structure processing apparatus 103 converts the electronic document (an XML file in the present embodiment) into a common data string on the basis of the area partitioning information. Each piece of data included in the common data string is identified by an area ID. The redaction-target document structure processing apparatus 103 sends information including the area IDs and the common data string to the management apparatus 102.

305: According to the signature method specified in the instructions, the management apparatus 102 selects a suitable redaction method information processing apparatus 104 that can process the signature method in question, and sends information including the area IDs and the common data string to the selected redaction method information processing apparatus 104.

306: According to the designated redactable signature method, the redaction method information processing apparatus 104 calculates a document hash value. In the case of the redactable signature method (SUMI-4) described in the present embodiment, a random number is generated for each piece of data as a member of the common data string, the random number is combined with that piece of data, and a hash value of the combined data is calculated. Then, the calculated hash values of all pieces of data constituting the common data string are combined, and a hash value (i.e. a document hash value) of the combined data is calculated. The redaction method information processing apparatus 104 sends information including the calculated document hash value and redactable signature method information that includes the various pieces of data used for the calculation (i.e. the area IDs, the random numbers or information from which the random numbers can be calculated, and the like) to the management apparatus 102.

307: According to the signature method given in the instruction, the management apparatus 102 selects a suitable redactable signature processing apparatus 105 that can process the signature method in question, and sends information including the document hash value to the selected redactable signature processing apparatus 105.

308: According to the designated redactable signature method, the redactable signature processing apparatus 105 calculates a signature value. In the case of the redactable signature method described in the present embodiment, the signature value is calculated according to the RSA signature algorithm. The redactable signature processing apparatus 105 sends information including the calculated signature value to the management apparatus 102.

309: According to the signature output format specified in the instructions, the management apparatus 102 selects a suitable signature file output apparatus 106 that can process the signature output format in question, and sends information including the signature value, the area partitioning information and the redactable signature method information to the selected signature file output apparatus 106.

310: The signature file output apparatus 106 reshapes information such as the signature value, the area partitioning information, the redactable signature method information and the like according to the designated signature output format, to obtain a signature file. In the case of the signature output format described in the present embodiment, the information is formed according to the XML signature format. The signature file output apparatus 106 sends information including the formed signature file to the management apparatus 102.

311: The management apparatus 102 outputs the signature file.

312: End

To select the suitable redaction-target document structure processing apparatus in step 303, it is sufficient that, for example, the management apparatus 102 previously holds information describing which redaction-target document structure processing apparatus (among a plurality of redaction-target document structure processing apparatuses existing in an ordinary case) can process which file type. Alternatively, a directory server not shown in FIG. 1 may be provided to manage information indicating which redaction-target document structure processing apparatus can process which file type.

The common data string outputted in step 304 is characterized in that, even when the data is changed at one of the areas defined by the area definition information, the common data string outputted is not changed except for the one piece of data corresponding to the changed area.

In the case where the redactable signature method information in step 306 includes information associated with a specific piece of data of the common data string, then an area ID may be used to specify which piece of data the information in question is associated with. As an example of such information, a random number generated in step 306 may be cited.

The above description has been given taking an example where the electronic signature is added in step 308. Differently from this, a time stamp may be added. In that case, the output data of the redactable signature processing apparatus 105 (TSA apparatus) can also include the time information. Here, the time stamp means data that certifies the time for which input data exists. For example, an electronic signature generated by the TSA apparatus with respect to data obtained by combining input data and the time information at that time point (when the time stamp is given) is known. Further, a time stamp technique without using an electronic signature technique is known. The present invention can use various time stamp techniques without regard to use of an electronic signature technique.

As the signature output format used in step 310 for output of the signature file output apparatus 106, a format called Cryptographic Message Syntax: RFC2630 (CMS) may be used instead of the XML signature format, for example. A suitable format may be selected in accordance with interface with other programs or systems using the signature file.

It is preferable that the signature file finally outputted in step 311 further includes information on a public key or a public key certificate required for verification of the signature value included in the signature file, since a user verifying the signature file can save time and effort in obtaining the public key.

The above description has been given with respect to the case where the redaction-target document structure processing apparatus 103, the redaction method information processing apparatus 104, the redactable signature processing apparatus 105, and the signature file output apparatus 106 process one kind of file type, one kind of redactable signature method, one kind of redactable signature method (conventional signature part) and one kind of signature output format, respectively. The present invention, however, can be applied to other cases. For example, one redaction-target document structure processing apparatus 103 may have a function of processing a plurality of file types. In that case, to specify which file type the redaction-target document structure processing apparatus 103 should process, input data from the management apparatus to the redaction-target document structure processing apparatus 103 may include information that specifies a file type. The same is true of the other apparatuses.

The above description has been given taking an example where the processing is performed sequentially in the order of step 301 through step 312. The present invention, however, is not limited to sequential processing. For example, the above description has been given taking an example where the management apparatus 102 sends the information including the signature value, the area partitioning information and the redactable signature method information to the signature file output apparatus 106 in step 309. The area partitioning information, however, may be sent just after step 302 (and before step 303). The redactable signature method information may be sent just after step 306 (and before step 307).

Figure 4:
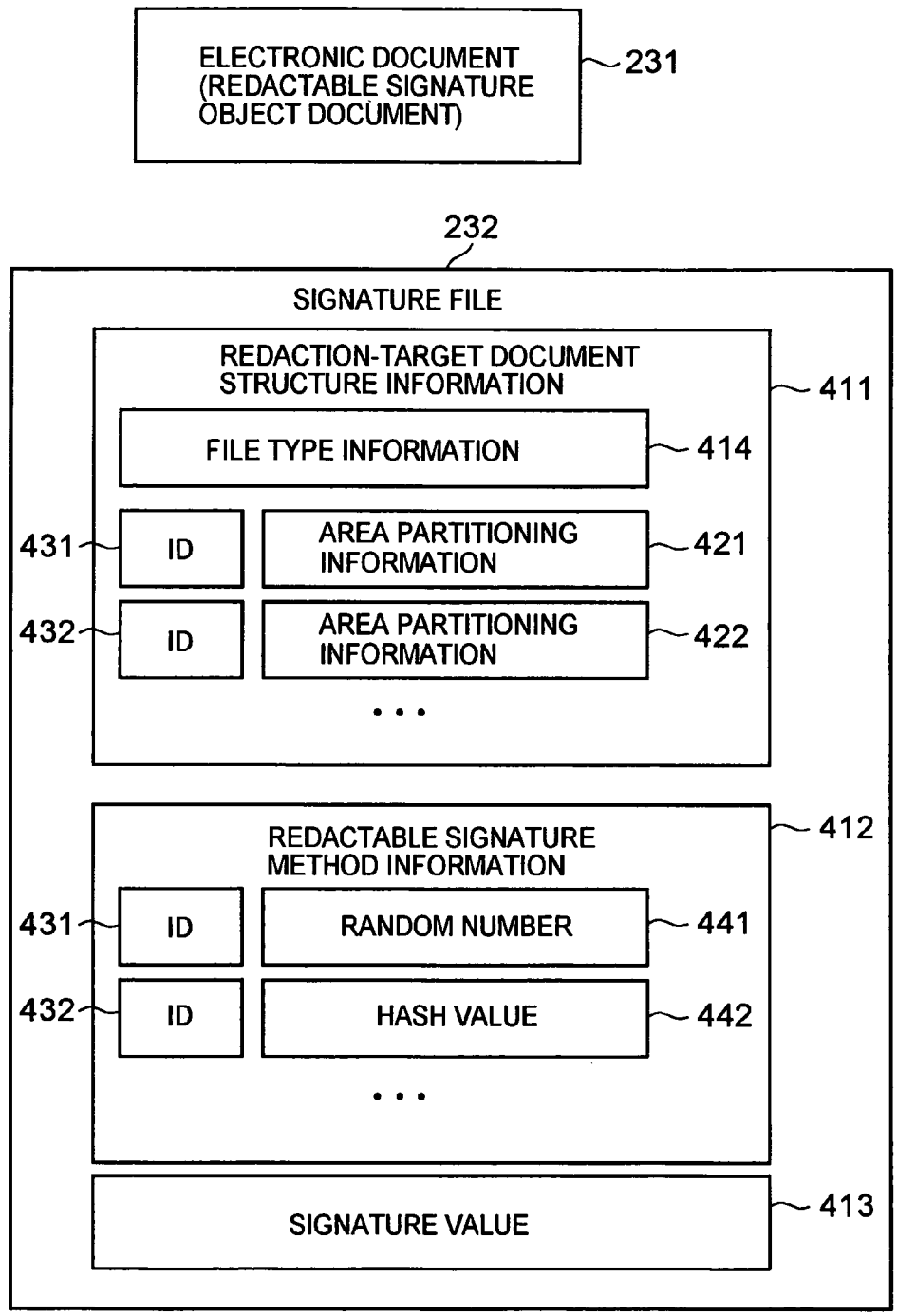
FIG. 4 is a schematic diagram showing configurations of an electronic document 231 inputted to the management apparatus 102 and a signature file 232 outputted from the management apparatus 102 in the embodiment.

FIG. 4 is a diagram showing outlines of a signature file 232 generated in the present embodiment and an electronic document 231 as an object of redactable signature. As shown in the figure, a signature file 232 comprises redaction-target document structure information 411, redactable signature method information 412 and a signature value 413.

The redaction-target document structure information 411 may comprise file type information 414 that specifies a file type (for example, XML format, JPEG format, or the like) of a redaction-target document, area partitioning information 421, 422 of the redaction-target document, and ID information 431, 432 for identifying the areas. The redaction-target document structure information 411 may further comprise other pieces of meta-information concerning the redaction-target document. For example, the redaction-target document structure information 411 may comprise a file name, a file path and the like. The redaction-target document structure information is dependent on the file type of the redaction-target document, but not on the redactable signature method.

The redactable signature method information 412 comprises information dependent on the algorithm for adding a redactable signature. For example, in the case where the SUMI-4 algorithm is employed for adding a signature, the redactable signature method information 412 may comprise random number information 441, a hash value 442 or the like, unique to each area. Here, each area can be identified by using the ID information 431, 432 that is included in the redaction-target document structure information and identifies each area uniquely. The redactable signature method information 412 is information dependent on the redactable signature method, but not on the file type of the document as the object of redaction.

Figure 5:
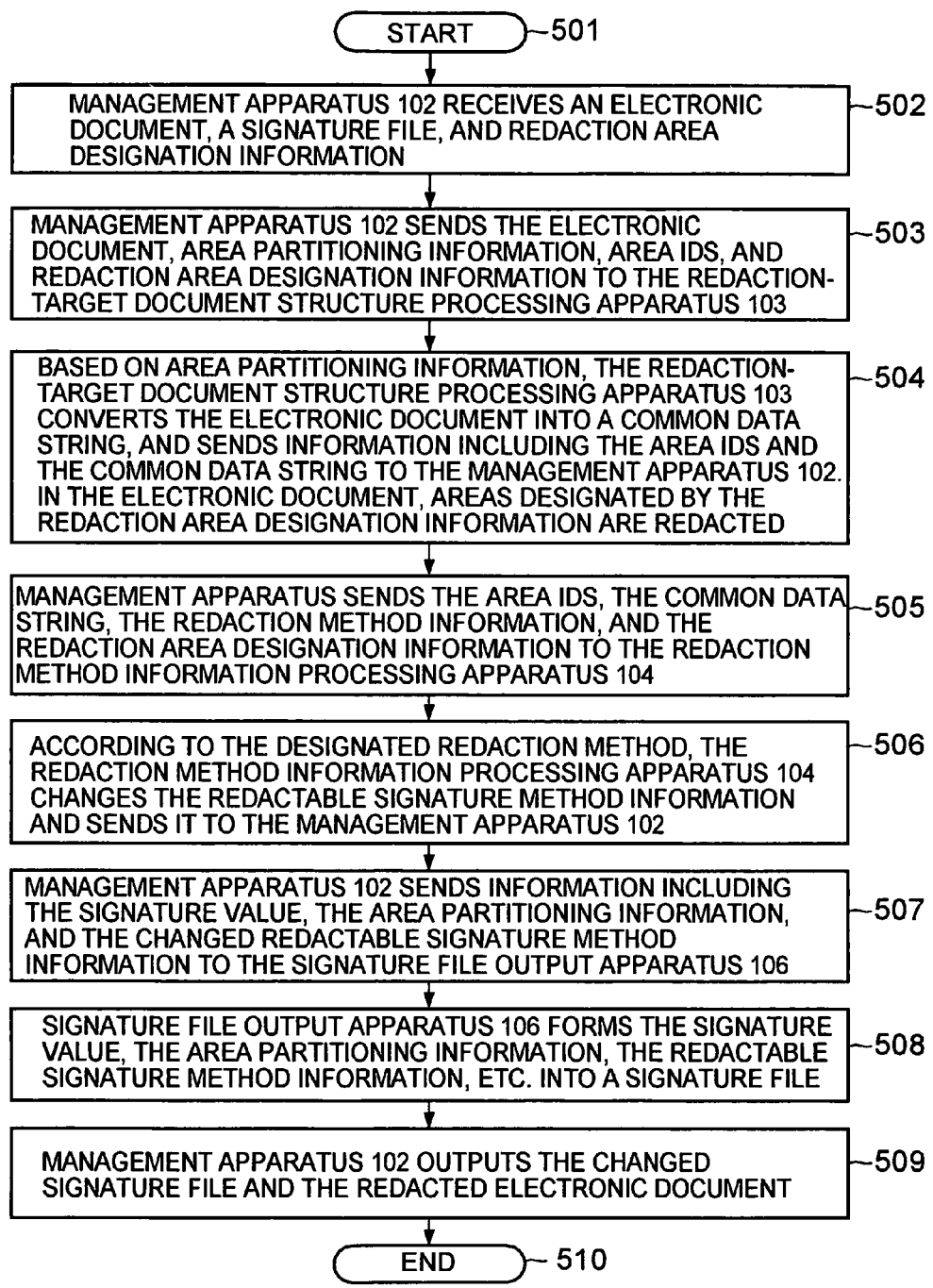
FIG. 5 is a flowchart showing an outline of processing for redacting a signed electronic document in the embodiment.

FIG. 5 is a flowchart showing an outline of processing flow of the redaction processing in the present embodiment.

The following description will be given taking an example where the redaction processing is performed using the same management apparatus 102, the same redaction-target document structure processing apparatus 103, the same redaction method information processing apparatus 104 and the same signature file output apparatus 106 as ones used at the time of signature generation. The present invention can be applied similarly to cases of different arrangements. For example, one or more of the management apparatuses 102, the redaction-target document structure processing apparatus 103, the redaction method information processing apparatus 104 and the signature file output apparatus 106 may be different from those used at the time of signature generation. Further, in the redaction processing, the redactable signature processing may not be used. For example, in the case where the same user performs both the signature generation processing and the redaction processing, or the user performing the signature generation processing and the user performing the redaction processing share a group of apparatuses, then it is efficient that the same apparatuses are used both at the signature generation and at the redaction processing, since the number of required apparatuses becomes smaller. Alternatively, in the case where some user performs only the signature generation processing or the redaction processing, then it is efficient to use a specialized apparatus for the signature generation processing or the redaction processing, since the configuration of each apparatus becomes simplified. Thus, a suitable arrangement may be employed in accordance with the number and type of users, network environment, the number and performance of each apparatus, and the like. Similarly in the below-described signature verification processing flow, the same management apparatus 102, the same redaction-target document structure processing apparatus 103, the same redaction method information processing apparatus 104, the same signature file output apparatus 106 and the like may be used both at the time of signature generation and at the time of redaction processing. Alternatively, different apparatuses may be used for different processes.

In the following, a description will be given taking an example where a signature file generated according to the processing flow shown in FIG. 3 and the electronic document as the object of that processing are given. That is, it is assumed that the file type of the electronic document is the XML format, the signature method is a combination of SUMI-4 and RSA signature, and the file type of the outputted signature file is the XML signature format.

501: Start

502: The management apparatus 102 receives an electronic document, a signature file and redaction area designation information. The redaction area designation information is information that identifies which parts of the electronic document should be redacted. For example, the redaction area designation information may designate parts to be redacted as a set of area IDs.

503: According to the file type indicated in the signature file, the management apparatus 102 selects a suitable redaction-target document structure processing apparatus 103 that can process the file type in question, and sends information including the area partitioning information and area IDs in the redaction-target document structure information indicated in the signature file and the redaction area designation information to the selected redaction-target document structure processing apparatus 103.

504: Based on the area partitioning information, the redaction-target document structure processing apparatus 103 converts the electronic document (an XML file in the present embodiment) into a common data string. Each piece of data included in the common data string can be identified by its area ID. Further, in the electronic document, parts designated by the redaction area designation information are redacted. Here, the redaction of the designated parts means deletion of data included in the designated areas. The redaction-target document structure processing apparatus 103 sends information including the area IDs, the common data string and the redacted electronic document to the management apparatus 102.

505: According to the signature method indicated in the signature file, the management apparatus 102 selects a suitable redaction method information processing apparatus 104 that can process the signature method in question, and sends information including the area IDs, the common data string, the redactable signature method information and the redaction area designation information to the selected redaction method information processing apparatus 104.

506: According to the redaction processing of the designated redactable signature method, the redaction method information processing apparatus 104 changes the redactable signature method information. In the case of the redactable signature method (SUMI-4) described in the present embodiment, this is performed as follows. That is, for each area ID given in the redaction area designation information, the corresponding piece of data in the common data string is combined with the corresponding random number in the redactable signature method information, and a hash value of the combined data is calculated, and the random number corresponding to the area ID in question in the redactable signature method information is deleted, and the calculated hash value is added in association with the area ID to the redactable signature method information. The redaction method information processing apparatus 104 sends information including the changed redactable signature method information to the management apparatus 102.

507: According to the signature output format given in the instructions, the management apparatus 102 selects a suitable signature file output apparatus 106 that can process the signature output format in question, and sends information including the signature file and the changed redactable signature method information to the selected signature file output apparatus 106.

508: According to the designated signature output format, the signature file output apparatus 106 reshapes information such as the signature value, the area partitioning information, the redactable signature method information and the like, to obtain a post-redactable signature file. In the case of the signature output format described in the present embodiment, the information is formed according to the XML signature format. The signature file output apparatus 106 sends information including the formed signature file to the management apparatus 102.

509: The management apparatus 102 outputs the changed signature file and the redacted electronic document.

510: End

In the description of step 504, it was stated that the redaction of the designated areas means deletion of data included in the designated areas. The present invention, however, may be different from this. For example, instead of deletion of data, the data may be replaced by character string data, such as "redacted", "***", or the like. Further, in the case where the file type indicates an image file such as a JPEG file, then the data may be replaced by data expressing a block color. As a method of converting a JPEG file to a common data string, or a method of replacing by data expressing a black color, the method disclosed in Japanese Un-examined Patent Application Laid-Open No. 2006-180472 may be used. Thus, depending on the file type, suitable conversion can be performed such that redacted parts can be recognized when the file in question is displayed, reproduced or used.

In the description of step 504, the conversion to a common data string and the redaction processing of an electronic document are performed in one step. The present invention, however, is not limited to this. For example, it is possible that only the processing of conversion to a common data string is performed in step 504, while the electronic document redaction processing is performed later (for example, between step 508 and step 509). Further, the electronic document redaction processing may be performed by an apparatus (for example, the management apparatus 102) other than the redaction-target document structure processing apparatus 103.

Figure 6:
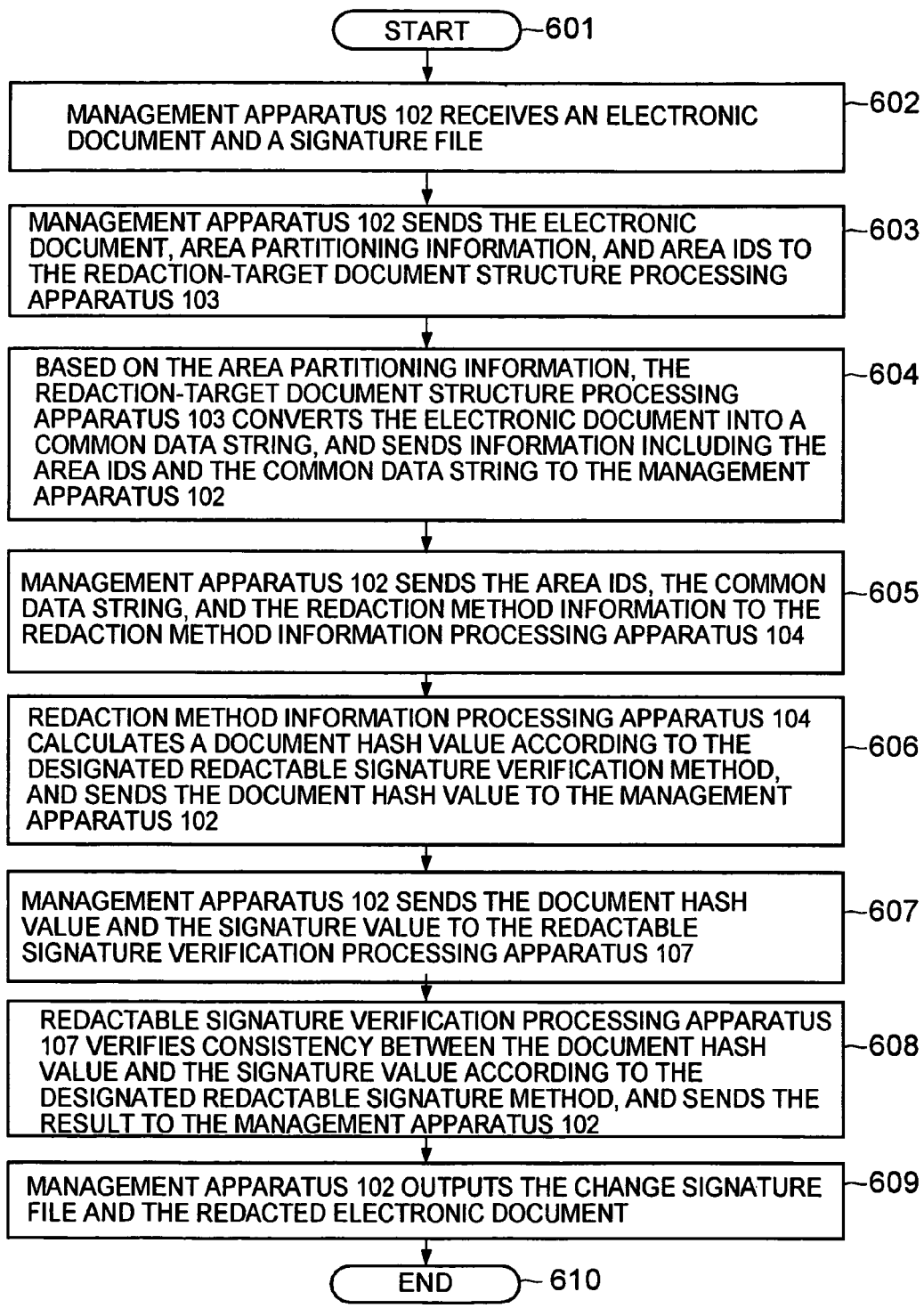
FIG. 6 is a flowchart showing an outline of processing for verifying a signed electronic document in the embodiment.

FIG. 6 is a flowchart showing an outline of a signature verification processing flow in the present embodiment.

The following description will be given taking an example where the redaction processing is performed using the same management apparatus 102, the same redaction-target document structure processing apparatus 103, and the same redaction method information processing apparatus 104 as those used at the time of signature generation, and using the redactable signature verification processing apparatus 107 that was not used at the time of signature generation. The present invention, however, can be applied to a different arrangement from this. For example, one or more of the management apparatus 102, the redaction-target document structure processing apparatus 103, the redaction method information processing apparatus 104, and the signature file output apparatus 106 may be different those used at the time of signature generation.

In the following, a description will be given taking an example in which verification is performed with respect to a signature file generated according to the processing flow shown in FIG. 3 and the electronic document to be signed, both of which have been redacted according to the processing flow shown in FIG. 5. That is, it is assumed that the file type of the electronic document is of an XML format, the signature method is a combination of SUMI-4 and RSA signature, and the file type of the outputted signature file is of XML signature format.

601: Start

602: The management apparatus 102 receives an electronic document and a signature file.

603: According to the file type indicated in the signature file, the management apparatus 102 selects a suitable redaction-target document structure processing apparatus 103 that can process the file type in question, and sends information including the electronic document, the area partitioning information and area IDs in the redaction-target document structure information indicated in the signature file to the selected redaction-target document structure processing apparatus 103.

604: Based on the area partitioning information, the redaction-target document structure processing apparatus 103 converts the electronic document (an XML file in the present embodiment) into a common data string. Each piece of data included in the common data string is identified by an area ID. The redaction-target document structure processing apparatus 103 sends information including the area IDs and the common data string to the management apparatus 102.

605: According to the signature method indicated in the signature file, the management apparatus 102 selects a suitable redaction method information processing apparatus 104 that can process the signature method in question, and sends information including the area IDs, the common data string and the redactable signature method information to the selected redaction method information processing apparatus 104.

606: The redaction method information processing apparatus 104 calculates a document hash value according to the verification method of the designated redactable signature method. In the case of the redactable signature method (SUMI-4) described in the present embodiment, this is performed as follows. That is, with respect to non-redacted areas among pieces of data constituting the common data string, the corresponding pieces of data are combined respectively with the corresponding random numbers included in the redactable signature method information, and hash values of the respective pieces of combined data are calculated. With respect to the redacted areas, the corresponding hash values are read from the redactable signature method information in which the hash values are included. Then, these hash values are combined with respect to all pieces of data constituting the common data string, and a hash value (a document hash value) of the combined data is calculated. The redaction method information apparatus 104 sends information including the calculated document hash value to the management apparatus 102. Here, judgment on whether an area is a redacted area or not may be performed by referring to the redactable signature method information, for example.

607: Based on the signature method indicated in the signature file, the management apparatus 102 selects a suitable redactable signature verification apparatus 107 that can perform verification according to the signature method in question, and sends information including the document hash value and the signature value included in the signature file to the selected redactable signature verification processing apparatus 107.

608: The redactable signature verification processing apparatus 107 verifies consistency between the document hash value and the signature value, on the basis of the designated redactable signature method. In the case of the redactable signature method described in the present embodiment, verification is performed according to the verification algorithm of the RSA signature method. The redactable signature verification processing apparatus 107 sends information including a verification result to the management apparatus 102.

609: The management apparatus 102 outputs the verification result.

610: End

Figure 7:
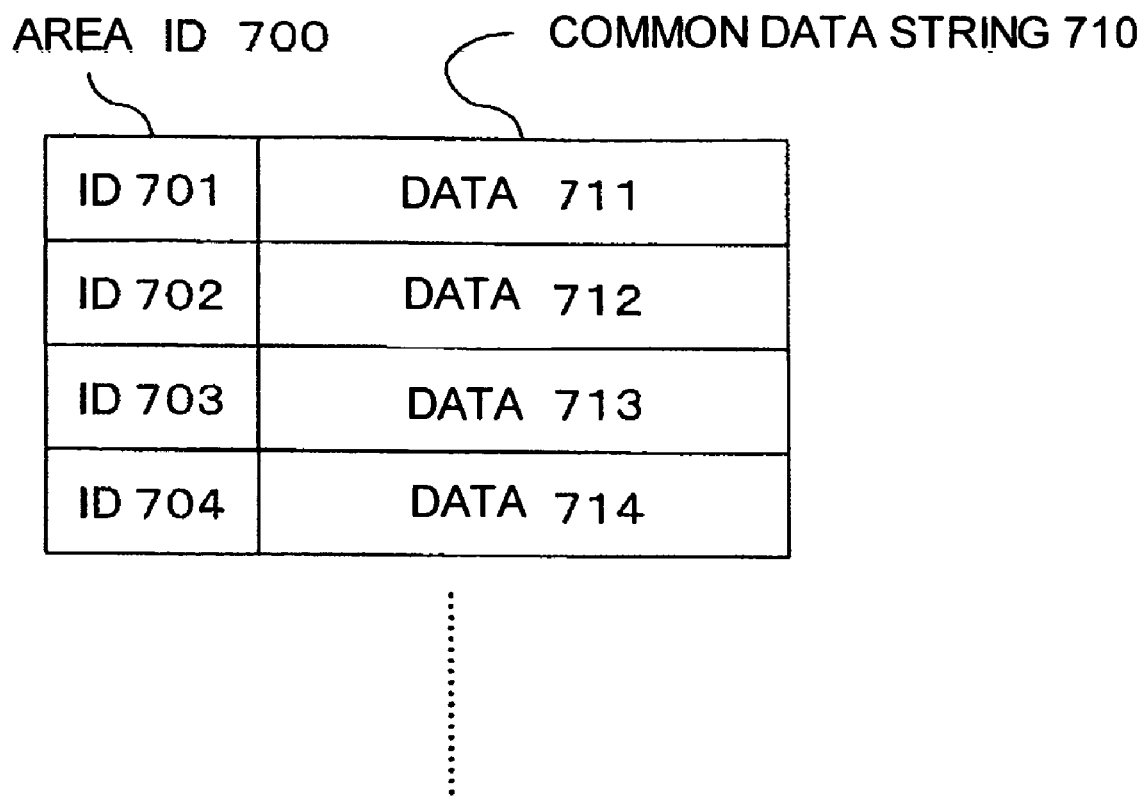
FIG. 7 is a diagram schematically showing a format of data configured from area IDs 700 and common data strings 710, outputted by a redaction method information processing apparatus 104, in the embodiment.

FIG. 7 is a diagram showing schematically a format of data that comprise area IDs 700 and a common data string 710 outputted by the redaction method information processing apparatus 104. As shown in the figure, pieces of data 711-714 constituting the common data string are associated with respective IDs 701-704. Thus, each piece of data can be identified by the corresponding ID.

Thus, according to the present embodiment a system is provided comprising the redaction-target document structure processing apparatus 103, which converts an electronic document into a common data string independent of the file type of the electronic document, and the redaction method information processing apparatus 104, which generates, converts and uses redaction method information according to the designated redactable signature method. This system can generate a redactable signature, perform the redaction processing, and verify a redactable signature.

According to the arrangement described in the present embodiment, the redaction-target document structure processing apparatus 103 does not depend on the redactable signature method (algorithm), and thus time and effort required for development and operation can be reduced. This is because one redaction-target document structure processing apparatus 103 capable of processing an electronic document of the file type XML can be combined with a plurality of redactable signature methods. In other words, in the case of developing both a system capable of adding a redactable signature conforming to the SUMI-4 format to an electronic document of the XML format and a system capable of adding a redactable signature conforming to the SUMI-5 format to an electronic document of the XML format, the same redaction-target document structure processing apparatus 103 can be commonly used for both the systems.

Further, the redaction-target document structure processing apparatus 103 does not require information (for example, random numbers, hash values, signature value, private key, and the like) dependent on a signature value of redactable signature, other than an electronic document as input, and thus is advantageous for ensuring security. For example, even when the redaction-target document structure processing apparatus 103 is developed by an organization that has developed another apparatus, or by an organization different from one which will operate the system, and it is suspected that an illegal program has been introduced, since it is difficult to control information relating to a signature, it is possible to reduce threats such as falsified signatures.

Further, according to the arrangement described in the present embodiment, the redaction method information processing apparatus 104 does not depend on the file type of an electronic document to be signed, and thus time and effort required for development and operation can be reduced. This is because, in the case of developing both a system capable of adding a redactable signature conforming to the SUMI-4 format to an electronic document of the XML format and a system capable of adding a redactable signature conforming to the SUMI-5 format to an electronic document of the JPEG format, the same redaction method information processing apparatus 104 can be used commonly for both the systems.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An authenticity assurance system that assures authenticity of an electronic document, the authenticity assurance system comprising:
    a management apparatus;
    one or more redaction-target document structure processing apparatuses; and
    one or more redaction method information processing apparatuses, wherein: the management apparatus:
    receives the electronic document, area partitioning information, and information including a file type, a redactable signature method, and a signature output format;
    specifies one redaction-target document structure processing apparatus configured to process an electronic document of the file type; and
    inputs the electronic document and the area partitioning information into the specified redaction-target document structure processing apparatus,
the specified redaction-target document structure processing apparatus:
    receives the electronic document and the area partitioning information from the management apparatus;
    divides the electronic document into one or more data sets according to the area partitioning information;
    generates a common data string not dependent on the file type, the common data string including the divided one or more data sets and not depending on a file type;
    generates an area ID for identifying at least one data set; and
    outputs the generated common data string and the area ID to the management apparatus,
the management apparatus:

specifies one redaction method information processing apparatus configured to perform the redactable signature method; and inputs the common data string and the area ID into the specified redaction method information processing apparatus, and the specified redaction method information processing apparatus:

receives the common data string and the area ID from the management apparatus;

generates a random number respectively for the at least one data set constituting the common data string;

according to the specified redactable signature method, calculates a hash value for the common data string based on the at least one data set constituting the common data string and the generated random number;

generates redactable signature method information that includes the hash value, the random number, data for calculating the random number, and the area ID; and outputs the generated redactable signature method information to the management apparatus.

2. The authenticity assurance system of an electronic document according to claim 1, wherein:

the authenticity assurance system further comprises:

one or more redactable signature processing apparatuses; and one or more signature file output apparatuses, the management apparatus:

specifies the redactable signature processing apparatus configured to perform the redactable signature method; and inputs the hash value to the redactable signature processing apparatus, the redactable signature processing apparatus specified by the management apparatus:

has a private key;

receives the hash value from the management apparatus;

calculates a signature value from the hash value and the private key; and outputs the signature value to the management apparatus, the management apparatus:

specifies one signature file output apparatus configured to process the signature output format; and inputs the area partitioning information, the redactable signature method information, and the signature value to the specified signature file output apparatus, and the specified signature file output apparatus:

receives the area partitioning information, the redactable signature method information, and the signature value from the management apparatus;

converts the area partitioning information, the redactable signature method information, and the signature value into a signature file conforming to the given signature output format; and outputs the signature file to the management apparatus.

3. An electronic document redaction system that deletes secret information included in a signed electronic document, the electronic document redaction system comprising:

a management apparatus;

one or more redaction-target document structure processing apparatuses;

one or more redactable signature method information processing apparatuses; and one or more signature file output apparatuses, wherein:

the management apparatus:

receives the electronic document, a first signature file, redaction area designation information, and information regarding a signature output format, the first signature file including information regarding a file type, information regarding a redactable signature method, area partitioning information, area IDs, and a signature value;

specifies one redaction-target document structure processing apparatus configured to process an electronic document of the file type; and inputs the electronic document, the area partitioning information, the area IDs, and the redaction area designation information to the specified redaction-target document structure processing apparatus, the specified redaction-target document structure processing apparatus:

receives the electronic document, the area partitioning information, the area IDs, and the redaction area designation information from the management apparatus;

based on the area partitioning information, converts the electronic document into a common data string including one or more data sets identified by the area IDs, the common data string not depending on a file type;

redacts an area of the electronic document to be designated by the redaction area designation information; and outputs the area IDs, the common data string and the redacted electronic document to the management apparatus, the management apparatus:

specifies one reduction method information processing apparatus configured to perform the redactable signature method; and inputs the area IDs, the common data string, the redaction method information, and the reaction area designation information to the specified reduction method information processing apparatus, the specified reduction method information processing apparatus:

receives the area IDs, the common data string, the redaction method information, and the reaction area designation information from the management apparatus;

according to the designated redaction method, changes the redactable signature method information; and sends the changed redactable signature method information to the management apparatus, the management apparatus:

specifies one signature file output apparatus configured to process the signature output format; and inputs the signature value, the area partitioning information, and the changed redactable signature method information to the specified signature file output apparatus, the specified signature file output apparatus:

receives the signature value, the area partitioning information, and the changed redactable signature method information from the management apparatus;

forms a second signature file including the signature value, the area partitioning information, and the redactable signature method information in accordance with the signature output format; and outputs the second signature file to the management apparatus, and the management apparatus outputs the second signature file and the redacted electronic document.

4. An authenticity verification system that verifies authenticity of an electronic document, the authenticity verification system comprising:

a management apparatus;

one or more redaction-target document structure processing apparatuses;
one or more redactable signature method information processing apparatuses; and
one or more redactable signature verification apparatuses, wherein:
the management apparatus:
receives the electronic document, a signature file, area IDs, the signature file including information regarding a file type and a redactable signature method, area partitioning information, and a signature value;
specifies one redaction-target document structure processing apparatus configured to process an electronic document of the file type; and
inputs the electronic document, the area partitioning information, and the area IDs to the specified redaction-target document structure processing apparatus, the specified redaction-target document structure processing apparatus:
receives the electronic document, the area partitioning information, and the area IDs;
based on the area partitioning information, converts the electronic document into a common data string including one or more data sets identified by the area IDs, the common data string not depending on a file type; and
sends the area IDs and the common data string to the management apparatus,
the management apparatus:
specifies one redactable signature method information processing apparatus configured to perform the redactable signature method; and
inputs the area IDs, the common data string, and the redactable method information to the specified redactable signature method information processing apparatus,
the specified redactable signature method information processing apparatus:
receives the area IDs, the common data string, and the redactable method information from the management apparatus;
calculates a document hash value according to the redactable signature method; and
sends the document hash value to the management apparatus,
the management apparatus:
specifies one redactable signature verification apparatus configured to verify the redactable signature method; and
inputs the document hash value and the signature value to the specified redactable signature verification apparatus,
the specified redactable signature verification apparatus:
receives the document hash value and the signature value from the management apparatus;
verifies consistency between the document hash value and the signature value according to the redactable signature method information; and
sends a verification result to the management apparatus, and the management apparatus outputs the verification result.

* * * * *